United States Patent
Paolini

(10) Patent No.: US 9,574,747 B2
(45) Date of Patent: Feb. 21, 2017

(54) SPECTRALLY CONTROLLABLE LIGHT VALVE

(71) Applicant: Telelumen, LLC, Saratoga, CA (US)

(72) Inventor: Steven Paolini, Saratoga, CA (US)

(73) Assignee: Telelumen, LLC, Saratoga, CA (US)

(*) Notice: Subject to any disclaimer, the term of this patent is extended or adjusted under 35 U.S.C. 154(b) by 0 days.

(21) Appl. No.: 14/299,317

(22) Filed: Jun. 9, 2014

(65) Prior Publication Data

US 2015/0354789 A1    Dec. 10, 2015

(51) Int. Cl.
| | | |
|---|---|---|
| *G02F 1/1347* | (2006.01) | |
| *F21V 14/00* | (2006.01) | |
| *G02F 1/23* | (2006.01) | |
| *F21S 11/00* | (2006.01) | |
| *G02F 1/133* | (2006.01) | |
| *E06B 9/24* | (2006.01) | |

(52) U.S. Cl.
CPC .............. *F21V 14/003* (2013.01); *E06B 9/24* (2013.01); *F21S 11/007* (2013.01); *G02F 1/13306* (2013.01); *G02F 1/13318* (2013.01); *G02F 1/13473* (2013.01); *G02F 1/23* (2013.01); *E06B 2009/2417* (2013.01); *E06B 2009/2464* (2013.01)

(58) Field of Classification Search
CPC ... F21V 14/003; F21S 11/007; G02F 1/13318; G02F 1/23
USPC ............................................................ 349/16
See application file for complete search history.

(56) References Cited

U.S. PATENT DOCUMENTS

| | | | |
|---|---|---|---|
| 6,552,760 B1* | 4/2003 | Gotoh et al. ................... 349/56 |
| 8,021,021 B2 | 9/2011 | Paolini | |
| 8,102,478 B2 | 1/2012 | Xue | |
| 9,217,247 B2 | 12/2015 | Behling et al. | |
| 2008/0164481 A1* | 7/2008 | Tai et al. ........................ 257/81 |
| 2009/0027759 A1* | 1/2009 | Albahri ...................... B60J 3/04 |
| | | | 359/277 |
| 2012/0217881 A1* | 8/2012 | Sethi .................... G02B 6/0068 |
| | | | 315/155 |
| 2012/0229048 A1 | 9/2012 | Archer | |
| 2012/0235883 A1 | 9/2012 | Border et al. | |
| 2013/0127927 A1 | 5/2013 | Ip et al. | |
| 2013/0154486 A1* | 6/2013 | Barrilleaux ........ H05B 37/0245 |
| | | | 315/158 |
| 2013/0307419 A1 | 11/2013 | Simonian et al. | |

FOREIGN PATENT DOCUMENTS

WO        2013098707 A2    7/2013

* cited by examiner

*Primary Examiner* — Paul Lee
(74) *Attorney, Agent, or Firm* — David Millers

(57) ABSTRACT

A system may include: a light valve exposed to incident light from an external light source. The light valve may independently modulate multiple wavelength bands of the incident light that are transmitted through the light valve and into an environment that the system illuminates. A control system can operate the light valve to control a spectral distribution of light transmitted through the light valve.

20 Claims, 3 Drawing Sheets

SPECTRALLY CONTROLLABLE LIGHT VALVE

BACKGROUND

Light from the sun may be the least expensive and most available daytime light source for lighting and most buildings have windows that pass sunlight or light from an exterior environment into the interior of the building. Curtains, blinds, and other window shades are commonly used to regulate the amount of sunlight that enters an environment. However, the capabilities of current windows and window controls are limited.

SUMMARY

In accordance with an aspect of the invention, a lighting system can employ an electronic light valve or other electrically controllable device in a window or other light passage to receive external light such as natural sunlight and modulate the received light to control spatial, directional, angular, temporal, or spectral variation of the lighting of an environment. In one specific configuration, the light valve may include a panel having a structure similar to structures found in liquid crystal display (LCD) or reflective display technology. The light valve may particularly be deployed as, on, or adjacent to a window, a skylight, or other passage that passes light from one environment into another, e.g., from an exterior environment to an interior environment or other at least partially sheltered environment. The light valve may operate in conjunction with a control system such as a general purpose computer or dedicated hardware that interprets light control information to control the spatial, temporal, and spectral characteristics of light transmitted through the light valve. The control information may take the form of lumen scripts that may be stored locally or streamed to the control system or the light valve.

One specific implementation is a system for illuminating an environment. The system includes a light valve to independently modulate transmission of several wavelength bands from a light source such as the sun, through the light valve and into the environment that the system illuminates. The control system may operate the light valve to control a spectral distribution of light transmitted through the light valve and thereby to control the illumination of the environment.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Figure 1:
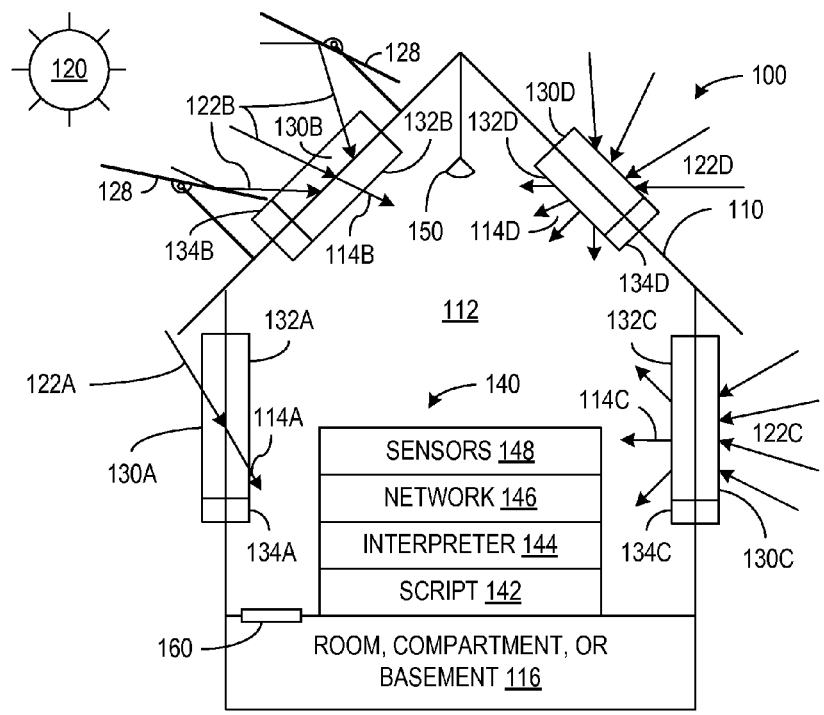
FIG. 1 shows an implementation of a system using an external light source to light an interior environment.

A lighting system can employ an external light source such as the sun and provide an interior or sheltered environment with lighting or illumination having spatial, angular, temporal, or spectral variations controlled according to illumination data sometimes referred to herein as a script. FIG. 1 shows an example of a system 100 providing lighting or illumination to interior environments 112 and 116, which may be rooms, compartments, or other spaces inside a building 110. Interior environment 112 may include a building portion that receives light directly from the outside of building 110, e.g., a room with windows, doors, or skylights, and interior environment 116 may include a building portion that indirectly receives exterior light through an intervening compartment of building 110. Building 110 may be, for example, a home, store, office building, healthcare facility, hospital, warehouse, or any other building. Environments 112 and 116 may, for example, be an interior space such as a room, an attic, a basement, the whole of the interior of building 110, or any compartment separated, for example, by walls, ceilings, or floors of building 110.

The environment outside of building 110 includes one or more external light sources 120. In examples described herein, external light source 120 is daylight which may include: sunlight directly from the sun; sunlight scattered by air, e.g., blue sky; scattered by other meteorological phenomena, e.g., by clouds; or scattered or reflected by other natural or manmade objects, e.g., from the moon, mountains, and bodies of water. The sun produces light having a broad spectrum and a high intensity on most days, but incident light 122A, 122B, 122C, and 122D, generically referred to herein as light 122, varies depending on factors such as the time of day and conditions in the exterior environment. In particular, light 122 may include sunlight, which often includes bright, nearly collimated light from the direction of the sun and diffuse light from other directions in the sky. Further, sunlight may be scattered, reflected, or filtered by meteorological conditions such as clouds, by natural features such as snow covered or forested mountains, bodies of water, or other terrain, or by manmade features such as neighboring buildings or other structures. FIG. 1 illustrates an example including a light collection system 128, e.g., mirrors on a sun-tracking mount, that reflect or otherwise collect sunlight to increase the amount of incident light 122 available for interior lighting. Accordingly, the direction, the angular distribution of culmination, and spatial distribution of incident light 122 may vary. The spectral composition of incident light 122 may also vary. For example, daylight generally varies with direction and time. In particular, diffuse daylight often has a higher color temperature than does direct sunlight.

Daylight is free and a high quality illumination source of incident light 122, and the sun is described herein as a primary example of an external light source 120 that may provide interior lighting. However, other external light sources 120 such as the moon, stars, or manmade light sources that happen to be in the exterior environment might alternatively be available or may contribute to incident light 122A, 122B, 122C, and 122D.

Building 110 includes one or more active light passages 130 such as windows, doors, skylights, or other light passages that pass light 122 from external sources 120 into interior environment 112. In the example of FIG. 1, embodiment building 110 includes a window 130A and a skylight 130B on the sunny side of building 110 and a window 130C and a skylight 130D on a shady side of building 110. Windows 130A and 130C and skylights 130B and 130D may occupy large areas, e.g., widths or heights on the order of tens of centimeters to one or more meters. Window 130A and skylight 130B may face south in the northern hemisphere (or north in the southern hemisphere) to receive intense and significantly collimated daylight during most of the day, or may face east in the morning or west in the evening. Window 130C and skylight 130D may face north in the northern hemisphere (or south in the southern hemisphere) to receive diffuse light during most of the day or may face east or west in the evening or morning.

Windows 130A and 130C and skylights 130B and 130D may include conventional structures such as frames and glass panes, but one or more of light passages 130A to 130D may additionally or alternatively include respective light valves 132A to 132D that are capable of modulating multiple spectral components of incident light 122A to 122D reaching light passages 130A to 130D from external sources 120. In one configuration, each of light valves 132A to 132D fits into openings adjacent to conventional windows, skylights, or other light passages. In another configuration, one or more of light valves 132A to 132D may replace a traditional transparent, diffuse, or translucent structure such as glass or plastic panes in respective light passages. As mentioned, each of light valves 132A to 132D may employ color or spectral filtering technology such as employed in LCD or reflective displays, but each of light valves 132A to 132D may be able to modulate more spectral bands than display systems generally accommodate. Also, light valves 132A to 132D may not require the spatial or "pixel" resolution normally required for video displays because light valves 132A to 132D are primarily intended for illumination and not for displaying an image for viewing. Although, in some cases, a light valve 132A, 132B, 132C, or 132D may both provide illumination for an interior environment and have a viewable image on the light valve. When displaying an image is not required, a light valve may uniformly modulate the spectral content of transmitted or reflected light across the entire area of a window or skylight. Alternatively, a light valve may contain an array of independent modulation areas, and each area may have dimensions typical of current displays or may have larger pixels with dimensions on the order of millimeters to meters. An array of independent modulation areas may be particularly desirable for creating spatial variations in lighting, for example, to create a bright light source or sources that move in the illuminated environment in a manner similar to movement of the sun, the moon, or stars. Similarly, a light valve with an array of independent modulation areas can create the effect that clouds or other variable phenomena might have on lighting in the illuminated environment and could simultaneously create an image of the clouds or other phenomena on the surface of the light valve.

Figure 2:
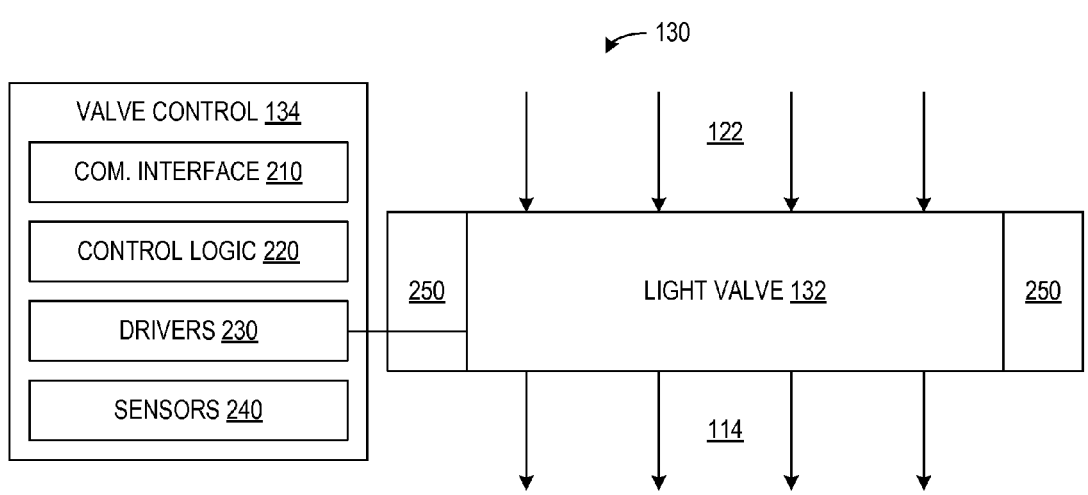
FIG. 2 shows an implementation of a light valve system.

Each light passage 130 in the illustrated implementation further has valve control electronics 134, which are shown in more detail in FIG. 2. In general, the light valve 132 of a light passage 130 is physically located within the light passage, e.g., in the window, skylight, or other opening through a building barrier, and a frame or other appropriate mounting structure 250 can hold light valve 132 in place. Valve control electronics 134 is not required to be in the opening of light passage 130, so that all or portions of valve control logic 134 may be remote from the opening. Valve control electronics 134 may be local in the sense that it controls a single light passage location, but valve control electronics 134 may work co-operatively with other control systems. In the implementation of FIG. 2, valve control electronics 134 includes a communication interface 210 capable of communicating with similar communication interfaces in the valve control electronics of one or more light passages 130 or with a main control system 140. For example, communication interface 210 may communicate with main control system 140 or with other light valve systems through a network such as a wireless (e.g., Bluetooth, Zigbee, or Wi-Fi) or hardwired (e.g., Ethernet) network. Control logic 220, which may include a microcontroller and memory storing control programs or scripts, may employ communication interface 210 to implement the suitable communications protocols.

During operation of system 100 of FIG. 1, each light valve 132 may receive incident light 122 and independently modulate or filter multiple spectral bands in multiple areas to produce transmitted light 114 that is at least part of the illumination of interior environment 112. Control logic 220 operates drivers 230 of an active light passage 130, for example, to apply respective bias voltages to an array of regions and to thereby control the transmission percentages for light in different wavelength bands passing through areas of the associated light valve 132. Such control is generally subject to programming, but control logic 220 may also be able to access one or more sensors 240 and operate driver circuits 230 based on sensor measurements in order to control the light transmission characteristics of multiple independently controllable areas of the corresponding light valve 132.

In the illustrated implementation, control electronics 134 includes one or more sensors 240. Sensors 240 may be of any type including light sensors, temperature sensors, motion sensors, occupancy sensors, or sensors of other atmospheric components or other conditions of environment 112. Light sensors, in particular, may be capable of measuring one or more characteristics of incident light 122 and/or one or more characteristics of transmitted light 114. Some light characteristics that could be measured include the intensity, direction, collimation, and spectral distribution of incident light 122 or transmitted light 114. Control logic 220 may use such light measurements or may send measurement data to main control system 140, for example, to be used in a learning program or in coordinating operation of light valve 132 with operation of other light sources illuminating an environment. For example, control logic 220 or main control system 140 may collect and process data from sensors 240 to learn the characteristics of a particular light valve 132 or of incident light 122 at the light valve 132, and a learning program may then automatically adapt the operating parameters of light valve 132 to provide desired performance of an active light passage 130. Control logic 134 or main control system 140 may also change lighting in environment 112 based on other types of measurements. If sensors 240 (or sensors 148) include occupancy or motion sensors, control logic 220 or main control system 140 may modify the intensity or spectrum of light transmitted through light passage 130 according to the number or location of people in environment 112. If sensors 240 (or sensors 148) include chemical or environmental condition sensors, control logic 220 modify the intensity or spectrum of light transmitted through light passage 130 to provide a warning or notification of a sensed condition. Sensors 240 may also be used in predictive programming of light, for example, to anticipate the light needs or desires of users based on sensed activity of the users.

In the system of claim 1, operation of light valves 132A to 132D may be coordinated through main control system 140. Alternatively, some, all, or none of light passages 130A to 130D may operate autonomously to control the characteristics of transmitted light 114A to 114D according to the specific programming of that light passage 130. In one implementation, each of light passages 130A to 130D may filter incident light 122A to 122D so that its transmitted light 114A to 114D has a spectral distribution set or programmed for that light passage. For example, one or more of light passages 130A to 130D may be programmed to compensate for a cloudy day by transmitting a higher percentage of incident red light so that the corresponding internal lighting 114A to 114D has a spectral distribution of a sunny day. More generally, valve control system 134A to 134D or main control system 140 may be operable to select a script from among a library of scripts that describe different illumination schemes and according to the script selected, to control respective transmission percentages for the wavelength bands through the light valves 132A to 132D.

Illumination of interior environment 112 may include just transmitted light 114A to 114D from light passages 130A to 130D or may additionally include light from additional light sources 150. Additional light sources 150 may be light sources that are not operating cooperatively with light passages 130A to 130D. For example, light sources 150 may be conventional light fixtures or conventional light passages not having a light valve or other spectral control system or may otherwise be independent of or not in communication with main control system 140 or light passages 130A to 130D. Alternatively, additional light sources 150 may include one or more luminaires that operate cooperatively with light passages 130A to 130D and may produce light with spectral distributions under control of main control system 140. For example, additional light sources 150 may include a luminaire such as described in U.S. Pat. No. 8,021,021, entitled "Authoring, Recording and Replication of Lighting" or U.S. Pat. App. Pub. No. 2012/022904, entitled "Luminaire System," both of which are hereby incorporated by reference herein in their entireties.

Main control system 140 may be a computer system or a light player such as described in U.S. Pat. No. 8,021,021 and may be able to process illumination data or scripts as described in U.S. Pat. App. Pub. No. 2012/0229048. Main control system 140 may particularly be a computer or data processing system including data storage or memory containing program code and lighting data or scripts 142, a processor capable of executing the program code to implement an interpreter 144, a user interface (not shown), and a network interface 146. In general, lighting data such as scripts 142 may be purchased separately from control system 140 and downloaded to storage in control system 140 or alternatively may be streamed to control system 140 or light passages 130 as needed for on-the-fly control of lighting. Main control system 140 may further include a sensor system 148 that may be any type of sensor including light sensors, temperature sensors, motion sensors, occupancy sensors, or sensors of other atmospheric components or other conditions of environment 112. A light sensor, for example, may measure the spectral content or other characteristics of internal light 114 or external light 122 at one or more locations in interior environment 112 or outside of building 110. However, main control system 140 could employ measurements of any type in control process such as described above, for example, to change lighting in environment 112 adapt to lighting conditions, according to the number of users present in environment 112, to give warning or notification of conditions in environment 112, or to predict the light needs or desires of users based on the activity of the users. As already mentioned, main control system 140 may not be necessary, and light passages 130A to 130D and light sources 150 may be able to communicate and cooperate with each other, e.g., through peer-to-peer network, without need of main control system 140.

System 100 may generally operate to allow a user to select a script 142 from among multiple scripts 142, e.g., a library of scripts, that may have been installed in memory of main control system 140 or control electronics 134A, 134B, 134C, or 134D, e.g., during manufacture or as a result of a subsequent user acquisition, e.g., purchases, downloads, or streams. The selected script 142 may represent a lighting scheme that the user desires for interior environment 112. For example, a user may select a script 112 that provides spatial, directional, angular, temporal, and spectral variations in illumination of environment 112 that: the user finds soothing, invigorating, or is otherwise intended to affect the user's mood or performance; provides lighting thought to be healthy or medically therapeutic; displays the contents of environment 112 in an aesthetically appealing, appalling or other chosen manner; displays or highlights items for retail sales; facilitates an activity undertaken in environment 112; or is coordinated with a multimedia or other presentation or performance occurring in environment 112. Main control system 140 interprets the selected script 112 and may send lighting data or instructions to the light passages 130A to 130D and any luminaires among light sources 150 in communication with main control system 140. In the control process, main control system 140 (or other control system) may take into account sensor measurements of illumination in environment 112 as described in U.S. Pat. App. Pub. No. 2013/0307419, entitled "Lighting System with Sensor Feedback," which is hereby incorporated by reference in its entirety. Main control system 140 may also take into account measurements of the spectral distribution of incident light 122 from the external light sources 120. Alternatively, control may be independent of sensor measurements even when such measurements are available.

Light valves 132A, 132B, 132C, and 132D alter respective incident light 122A, 122B, 122C, and 122D to produce transmitted light 114A, 114B, 114C, and 114D, and the alterations may differ and be coordinated by main control system 140 or a peer system of control electronics 134A, 134B, 134C, and 134D. In particular, transmitted light 114A, 114B, 114C, and 114D may have different spectral distributions selected according to the selected script 142 for lighting of environment 112. Some characteristics of the illumination of environment 112 that a user may control include current spectral, spatial, angular, or directional distributions of the illumination and evolution of time variations of spectral, spatial, angular, or directional distributions of illumination. For example, incident light 122A and 122B may have a strong directional or collimated component, which allows control of collimated components of the illumination of environment 112 according to a desired directional or angular distribution for lighting. Similarly, incident light 122C and 122D may be more diffuse allowing control of diffuse components of the illumination of environment 112.

FIG. 1 shows main control system 140 as a separate and centralized device, but the functions of main control system 140 may be included in or distributed among one or more other devices including but not limited to light passages 130A to 130D or their control electronics 134A to 134D.

Control methods and systems of illumination of an environment such as environment 112 that receives direct lighting from external sources 120 through light valves 132A to 132D can also be applied to an environment such as environment 116 that receives indirect lighting. In particular, environment 116 may receive light through a light passage 160 from environment 112. In effect, environment 112 may mix light from light valves 132A to 132D and other sources 150 and a portion of that light may pass through light passage 140 to indirectly light environment 116. Light passage 160 in general may be a passive structure that permits the passage of light through a building barrier such as a wall, floor, or ceiling, or light passage 160 may include a light valve that controllably filters spectral components of light. For example, light passage 160 could be substantially identical to light passages 130A to 130D. In one configuration, light passage 160 (or light passages 130A to 130D) could occupy the entirety of a building barrier such as a wall, ceiling, floor, or roof section.

Light valves 132A to 132D under control of valve control electronics 134A to 134D or main control system 140 can independently modulate multiple wavelength or frequency bands of the broad spectrum incident light 122A to 122D. For example, a light valve 132 may control transmissive, reflective, or transflective effects that one or more modulation areas have on specific wavelength bands of light. A light valve structure capable of such modulation can be based on modification of display technology currently employed in computer monitors, flat panel television, and e-readers. For example, layers from commonly available LCD panels with standard red-green-blue (RGB) filters could be used as a light valve. A deconstructed computer monitor can provide an LCD matrix able to implement the basic principles of a light valve described above, but the maximum intensity with a "white" screen may be about 50% or less of the incident intensity. Also, when unpowered or "all black," such a matrix may leak about 10% of the incident intensity. Technologies and structures used in reflective displays may provide higher maximum intensity or less undesired leakage. However, conventional display technologies may provide only three modulated wavelength bands, e.g., red, blue, and green or cyan, magenta, and yellow. A higher number of filters, e.g., four, five or more, may be desired to provide finer control of spectral distributions. A lower spatial resolution light valve, e.g., with larger pixels or only a single pixel, may be well suited to broad spectrum, high quality illumination.

Figure 3:
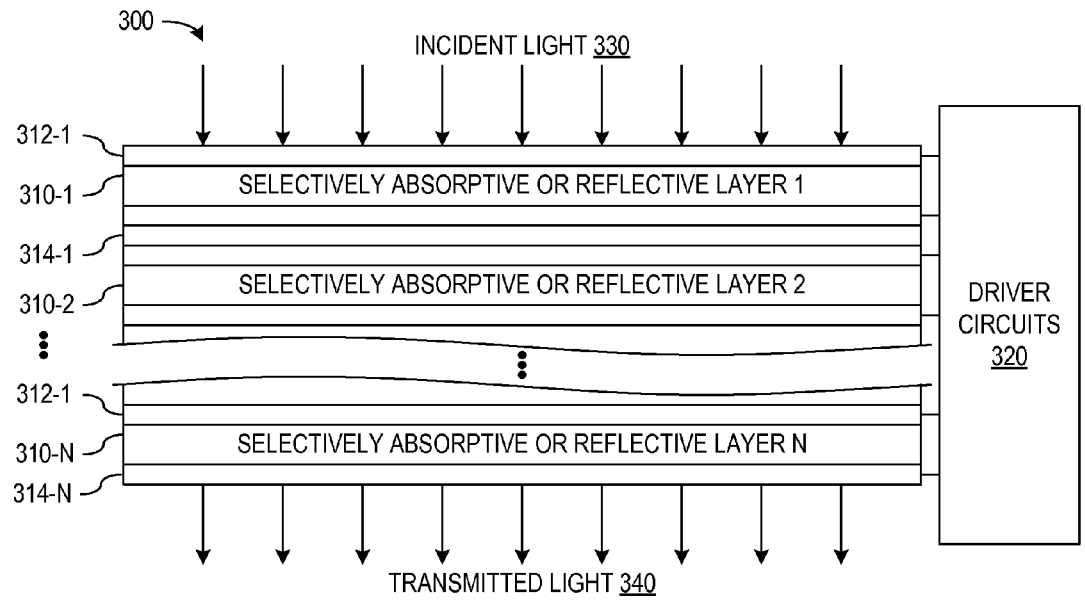
FIG. 3 schematically illustrates a light valve in accordance with an implementation using stacked, spectral filters.

FIG. 3 shows a cross-section that schematically illustrates one example of a light valve 300, which may be used for light valves of FIG. 1. Light valve 300 includes N, where N is three or more and preferably five or more, selectively transmissive layers 310-1 to 310-N, generically referred to herein as layers 310. Each layer 310 may be activated to transmit a controllable fraction of the incident light 330 in a corresponding wavelength band. Each layer 310 may transmit all or most light in the wavelength bands corresponding to other layers 310. Such layers 310 may be constructed using a variety of technologies that are in current use in displays or may employ techniques that are yet to be developed. In one example, layer 310-1 to 310-N contain a liquid crystal material to which different dyes are bound and electric potentials are applied across layers 310-1 to 310-N to control how effective the dye is at absorbing or reflecting light in a wavelength band associated with the dye.

In the example of FIG. 3, each of layers 310-1 to 310-N has an array of upper electrodes 312-1 to 312-N and an array of lower electrodes 314-1 to 314-N made of a transparent conductor such as indium tin oxide (ITO), and voltages between upper and lower electrodes may activate or change the percentages of incident light that each layer 310-1 to 310-N absorbs or reflects from the respective wave length bands. Upper plates 312-1 to 312-N or lower plates 314-1 to 314-N may be divided into areas that define independent modulation areas or what might be referred to as pixels in display technology. However, a single "pixel" area covering the entire area of light valve 300 may be sufficient, or multiple separate "pixel" areas may be large or may be controlled at the same potential if uniform behavior is desired across the area of the light valve 300. If desired, a multi-pixel light valve 300 may create spatial variation in the transmitted light. Driver circuitry 320 is electrically connected to the electrodes 312-1 to 312-N and 314-1 to 314-N and may correspond to all or a portion of valve control electronics 134A or 134B of FIG. 1. By separate modulation of the wavelength bands corresponding to layers 310-1 to 310-N, light valve 300 can pass transmitted light 340 having a different spectral distribution from incident light 330.

Figure 4:
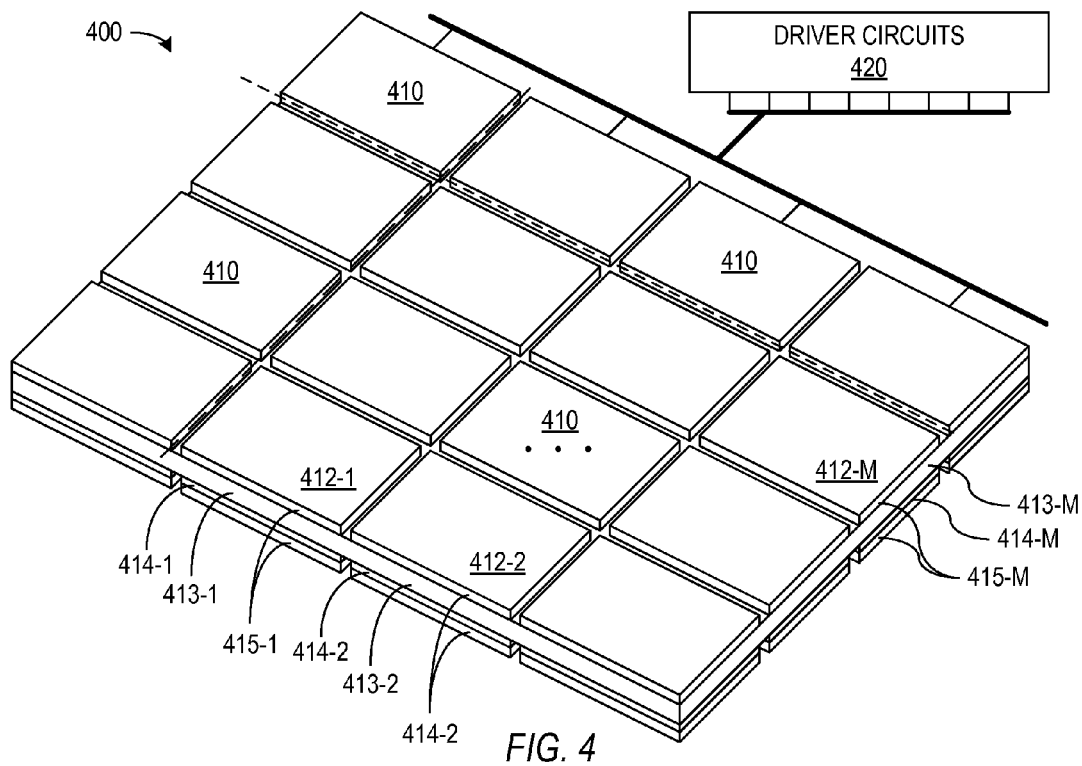
FIG. 4 schematically illustrates a light valve in accordance with an implementation using laterally-distributed, spectral filters.

A light valve may alternatively employ laterally distributed modulation areas or sub-pixels that transmit different wavelength bands. FIG. 4, for example, shows a portion of a light valve 400 including one or more pixels 410, each containing M laterally spaced modulation areas 412-1 to 412-M, generically referred to herein as modulation areas 412. The M modulation areas 412-1 to 412-M in each pixel 410 may include N (N≤M) different types of filters that modulate the intensity of light in N different spectral bands. For example, in a configuration in which each pixel 410 contains nine modulation areas 412 corresponding to nine different wavelength bands, each pixel may be able to independently control the relative intensities of up to nine different wavelength bands. In one implementation, each modulation area 412-1 to 412-M transmits a controllable fraction of incident light having a wavelength within a wavelength band corresponding to the modulation area 412-1 to 412-M and absorbs or reflects light having wavelengths outside the wavelength band corresponding to the modulation area 412-1 to 412-M. FIG. 4 shows an example in which modulation areas 412-1 to 412-M includes respective active layers 413-1 to 413-M, generically referred to herein as active layers 413. Active areas 413-1 to 413-M overlie respective filter areas, 414-1 to 414-M, which may differ chemically, e.g., contain different dyes. In one configuration, each of modulation areas 413-1 to 413-M transmits a percentage of the incident light, and each of the associated filters 414-1 to 414-M only transmits light in a wavelength band corresponding to the associated modulation areas 412-1 to 412-M. The percentages that modulation areas 412-1 to 415-M transmit depend on respective voltages applied to respective transparent, terminal pairs 415-1 to 415-M, generically referred to herein as terminal pairs 415. Driver circuits 420 may be connected to pixels 410 or modulation areas 412 to control voltages applied across electrode pairs 415 and thereby control transmission percentages of modulation areas 412 of light valve 400.

The examples of structures of light valves 300 and 400 illustrated in FIGS. 3 and 4 may be altered or combined in many ways. For example, two independent or cooperative light valves could be stacked or provided on opposite sides of a pane of glass or other intervening transparent layer. The light valve structures described may also be combined with other optical elements or controls for other characteristics of the transmitted light. For example, spectral filtering may be combined with overall intensity control device such as an eletrochromic device. Optical elements could control coherence or diffusion of the light or use an interference to change spatial distribution of the transmitted light. The polarization or direction of the transmitted light could be similarly controlled.

Figure 5A:
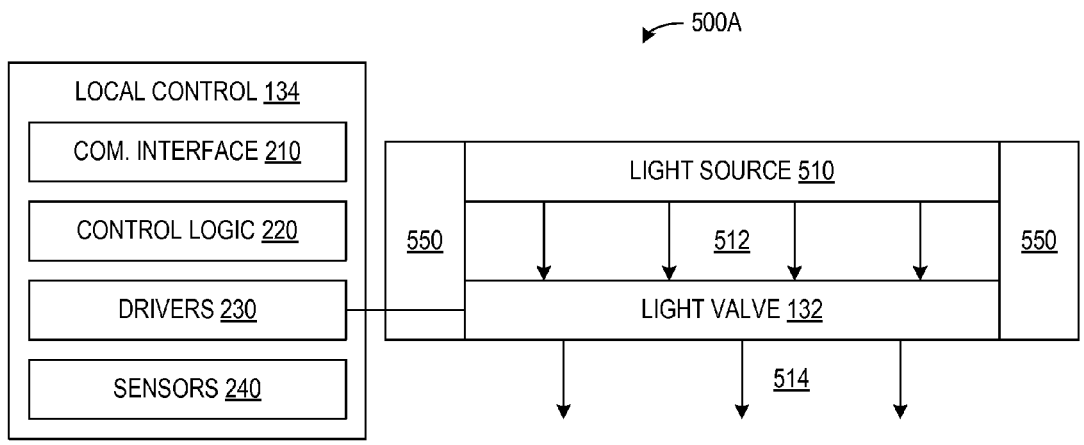
FIGS. 5A and 5B show implementations of luminaires employing a manmade light source and a light valve to alter the spectral, temporal, angular, or spatial distributions of the illumination of an environment.

A multi-channel light valve such as shown in FIG. 3 or 4 can be used with broadband light sources other than the sun and particularly with manmade light sources to create a luminaire with a controllable illumination spectrum and without the need of an external light source. FIG. 5A, for example, illustrates a luminaire 500A including a light valve 132 that filters incident light 512 from a light source 510 to produce a programmable spectral distribution for illumination 514 of an environment. Light source 510 is a manmade, broadband light source and may contain one or more High-Intensity Discharge (HID) lamps, halogen lamps, LEDs, lasers, collimated light sources, or polarized light sources. A valve control system 134, which may be substantially the same as described above with reference to FIGS. 2 and 3, can be used to control the respective transmission percentages that occur for N wavelength bands where N is three, four, five, or more. Luminaire 500 may then be used in substantially the same manner as luminaires containing multiple distinct types of light sources such as described in U.S. Pat. No. 8,021,021 or U.S. Pat. App. Pub. No. 2012/0229048.

Figure 5B:
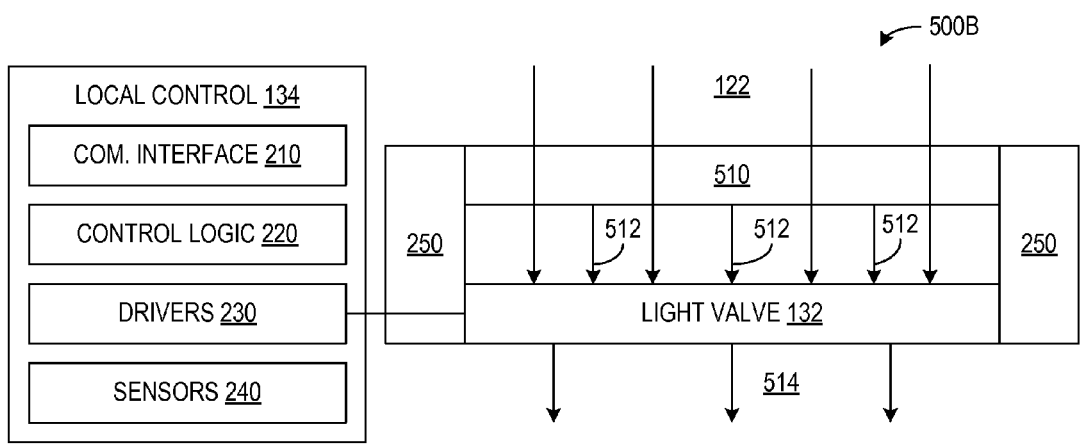

Luminaire system 500A has its own light source 510 and does not need to be mounted in a light passage. Accordingly, a mounting system 550 may be employed to mount or set luminaire 500A anywhere. Luminaire 500B as shown in FIG. 5B uses a frame or mounting system 250 that permits mounting of luminaire 500B in a light passage such as a window, door, or skylight as described above. In such configurations, light source 510 may be retractable, transparent, or have openings that pass sufficient external light 122 that light valve 132 can be used to modulate the characteristics of incident daylight 122 (with or without a contribution from light source 510) for internal use as described above with reference to FIG. 1. When the external light may be insufficient, e.g., at night, light source 510 in luminaire 500B may be activated, so that light source 510 alone or with an available external light source provides light incident on light valve 132. For example, luminaire 500B, when employed in a light passage, may transition between solely transforming incident daylight 122 according to a lighting scheme chosen for illumination 514 of an environment and powering up light source 510 to provide incident light 512 as needed to maintain the lighting scheme chosen for illumination 514 of the environment.

Some elements of the above-described systems can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading or streaming of data and executable instructions.

Although particular implementations have been disclosed, these implementations are only examples and should not be taken as limitations. Various adaptations and combinations of features of the implementations disclosed are within the scope of the following claims.

What is claimed is:

1. A system for illuminating an environment, the system comprising:
   a light valve exposed to incident light from an external light source that is outside the environment illuminated, the light valve independently modulating a plurality of wavelength bands of the incident light transmitted through the light valve and into the environment that the system illuminates; and
   a control system connected to operate the light valve to control a spectral distribution of light transmitted through the light valve, wherein
   the light valve comprises a plurality of layers respectively corresponding to the plurality of wavelength bands, wherein each layer transmits a controllable fraction of incident light in the corresponding wavelength band.

2. The system of claim 1, wherein the plurality of wavelength bands includes at least three wavelength bands.

3. The system of claim 1, wherein the plurality of wavelength bands includes at least five wavelength bands.

4. The system of claim 1, wherein the layers are stacked so that light passing through the light valve sequentially passes through the layers.

5. The system of claim 1, wherein the layers in the light valve occupy respective areas that are laterally spaced apart.

6. The system of claim 1, wherein the external light source is outside of a building and the environment is inside the building.

7. The system of claim 6, further comprising a manmade light source positioned to illuminate the light valve on a side that the external light source illuminates.

8. The system of claim 1, wherein the incident light comprises direct, reflected, or scattered daylight.

9. The system of claim 1, further comprising a frame to mount the light valve in a light passage into the environment that the system illuminates.

10. The system of claim 9, wherein the light passage is selected from a group consisting of a window, a skylight, a door, and an opening through a barrier of a building.

11. The system of claim 1, further comprising a light sensor that measures characteristics of light incident on the light valve or light transmitted out of the light valve, wherein the light sensor provides measurements of the characteristics to the control system.

12. The system of claim 1, wherein the environment illuminated is a compartment of a building, and the external light source is outside the compartment.

13. The system of claim 1, further comprising a sensor, wherein the control system selects operating parameters of the light valve based on measurements from the sensor and lighting data representing desired characteristics of the illumination.

14. A system comprising:
   a light valve exposed to incident light from an external light source, the light valve independently modulating a plurality of wavelength bands of the incident light transmitted through the light valve and into an environment that the system illuminates; and
   a control system connected to operate the light valve to control a spectral distribution of light transmitted through the light valve, wherein the control system comprises a communication interface to communicate with one or more lighting elements that cooperate with the light valve to provide the illumination of the environment.

15. The system of claim 14, further comprising a frame to mount the light valve in a light passage through a barrier that is part of a building so that light from a first side of the barrier and passing through the light passage passes through the light valve and into the environment that the system illuminates, the environment being on a second side of the barrier.

16. The system of claim 15, wherein the light passage is selected from a group consisting of a window, a skylight, a door, and an opening through an interior wall of the building.

17. A system comprising:
a light valve exposed to incident light from an external light source, the light valve independently modulating a plurality of wavelength bands of the incident light transmitted through the light valve and into an environment that the system illuminates; and
a control system connected to operate the light valve to control a spectral distribution of light transmitted through the light valve, wherein the control system is operable to select a script from among a plurality of scripts that describe different illumination schemes and according to the script selected, to control respective transmission percentages for the wavelength bands through the light valve.

18. The system of claim 17, further comprising a frame to mount the light valve in a light passage through a barrier in a building so that light from a first side of the barrier and passing through the light passage passes through the light valve and into the environment that the system illuminates, the environment being on a second side of the barrier.

19. The system of claim 18, wherein the light passage is selected from a group consisting of a window, a skylight, a door, and an opening through a barrier of a building.

20. The system of claim 18, further comprising a light sensor coupled to provide the control system with a measurement of spectral content of the incident light or spectral content of light transmitted out of the light valve.

* * * * *